W. G. HEARN.
Whiffletrees.
No. 164,557.  Patented June 15, 1875.
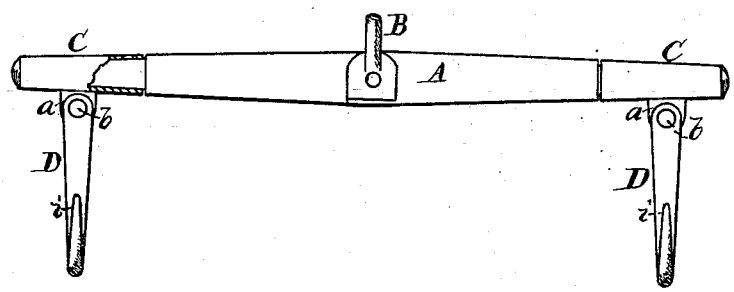
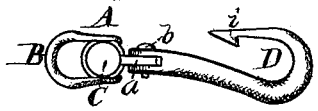
WITNESSES:
James F. Duhamel.
Thomas Byrne.
INVENTOR:
W. G. Hearn.
Per H. S. Abbot.
Attorney.
THE GRAPHIC CO. PHOTO-LITH. 39 & 41 PARK PLACE, N.Y.

UNITED STATES PATENT OFFICE.

WILLIAM G. HEARN, OF DYER'S STATION, TENNESSEE, ASSIGNOR OF TWO-THIRDS HIS RIGHT TO JAMES L. BERY AND M. HUTCHISON.

IMPROVEMENT IN WHIFFLETREES.

Specification forming part of Letters Patent No. 164,557, dated June 15, 1875; application filed May 5, 1875.

*To all whom it may concern:*

Be it known that I, WILLIAM G. HEARN, of Dyer's Station, county of Gibson and State of Tennessee, have invented certain new and useful Improvements in Single-Trees, of which the following is a specification:

The nature of my invention consists in a metallic ferrule fastened on the end of the single-tree, and provided on its front side with a projecting lug, to which a hook is pivoted for attaching the trace, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1 is a plan view of a single-tree embodying my invention, and Fig. 2 is an end view of the same.

A represents a single-tree of ordinary form and size, and provided in the center with a metal loop, B, for attachment in its place. The ends of the single-tree are turned down slightly, and upon each end is placed a metal ferrule or socket, C, having a hole in one side near its inner end for the passage of a small pin, nail, or screw to hold it thereon. On the front side of the ferrule C is formed a lug or projection, a, of suitable strength for the purposes intended. D represents a hook, the shank end of which is slotted or forked horizontally to fit over the lug a, to which it is then pivoted by a pin, b, passing vertically downward through the forked end of the hook and the lug. The hook curves upward and backward, and is, on the under side of its point, provided with a spur, i.

The trace is to be fastened in this hook, the spur i preventing it from becoming unhooked, from the fact that as soon as the trace slacks the hook will turn on its pivot to one side or the other, and the trace thus be prevented from slipping by said spur. Furthermore, the strain on the single-tree is not, as usual, on the extreme end thereof, but is more evenly distributed, and the end of the tree is completely protected and strengthened by the ferrule on the end thereof.

Having thus fully described my invention, what I claim as new, and desire to secure by Letters Patent, is—

The combination, with a single-tree, A, of the ferrule C, provided with a lug, a, on its front side, and the hook D, formed with a spur, i, and having its rear or shank end slotted or forked horizontally, and pivoted to the lug a by a pin, b, all substantially as and for the purposes herein set forth.

In testimony that I claim the foregoing as my invention, I hereunto affix my signature this 1st day of May, 1875.

W. G. HEARN.

Witnesses:
 W. J. DAVIDSON,
 P. D. JARVIS.